(12) United States Patent
Mihajlovic et al.

(10) Patent No.: US 9,293,160 B1
(45) Date of Patent: Mar. 22, 2016

(54) MAGNETIC STABILIZATION AND SCISSOR DESIGN FOR ANOMALOUS HALL EFFECT MAGNETIC READ SENSOR

(71) Applicant: HGST Netherlands B.V., Amsterdam (NL)

(72) Inventors: Goran Mihajlovic, San Jose, CA (US); Neil Smith, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/616,621

(22) Filed: Feb. 6, 2015

(51) Int. Cl.
*G11B 5/37* (2006.01)

(52) U.S. Cl.
CPC . *G11B 5/37* (2013.01); *G11B 5/374* (2013.01)

(58) Field of Classification Search
CPC .... G01R 33/07; G01R 33/072; G01R 15/202; G11C 11/18; H01L 43/06; H01L 43/14; H01L 43/04; G11B 5/374; G11B 5/37; G11B 5/372
USPC .......................... 360/112; 365/170; 324/207.2
See application file for complete search history.

(56) References Cited

U.S. PATENT DOCUMENTS

| | | | |
|---|---|---|---|
| 5,225,141 A | 7/1993 | Hendry | |
| 5,361,226 A | 11/1994 | Taguchi et al. | |
| 5,657,189 A | 8/1997 | Sandhu | |
| 6,195,228 B1 | 2/2001 | Bennett et al. | |
| 6,791,792 B2 | 9/2004 | Takahashi | |
| 7,576,948 B2 | 8/2009 | Covington et al. | |
| 8,390,954 B2 | 3/2013 | Das et al. | |
| 8,513,944 B2 | 8/2013 | Rodmacq et al. | |
| 8,749,926 B1 | 6/2014 | Le et al. | |
| 2003/0039062 A1* | 2/2003 | Takahasahi | 360/112 |
| 2007/0195452 A1* | 8/2007 | Covington et al. | 360/112 |
| 2009/0154030 A1* | 6/2009 | Yamada et al. | 360/319 |
| 2009/0176129 A1* | 7/2009 | Sarbanoo et al. | 428/811.3 |
| 2010/0061014 A1* | 3/2010 | Das et al. | 360/112 |
| 2012/0162810 A1* | 6/2012 | Das et al. | 360/75 |

* cited by examiner

Primary Examiner — Will J Kilmowicz
(74) Attorney, Agent, or Firm — Zilka-Kotab, PC (57) ABSTRACT

A system comprising a sensor with a free layer that exhibits an anomalous Hall effect is disclosed. Further, the sensor has a magnetic underlayer below the free layer in a track direction for biasing a magnetic orientation of the free layer in a first magnetic orientation, and a magnetic overlayer above the free layer in the track direction for biasing the magnetic orientation of the free layer in the first magnetic orientation. Still further, the sensor has a lower nonmagnetic spacer layer between the magnetic underlayer and the free layer, and an upper nonmagnetic spacer layer between the magnetic overlayer and the free layer.

9 Claims, 4 Drawing Sheets

MAGNETIC STABILIZATION AND SCISSOR DESIGN FOR ANOMALOUS HALL EFFECT MAGNETIC READ SENSOR

FIELD OF THE INVENTION

The present invention relates to data storage systems, and more particularly, this invention relates to a magnetic read sensor that uses the anomalous Hall effect.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to meet this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. With regard to the magnetic head, this means reducing the shield-to-shield spacing of the read head (i.e. the read gap thickness). However, physical limitations as well as manufacturing limitations have constrained the amount by which the gap thickness of the magnetic read head can be reduced. Therefore, there remains a need for magnetic sensor design that can provide the reduced gap thickness needed for future magnetic recording requirements.

SUMMARY

A system comprising a sensor with a free layer that exhibits an anomalous Hall effect is disclosed. Further, the sensor has a magnetic underlayer below the free layer in a track direction for biasing a magnetic orientation of the free layer in a first magnetic orientation, and a magnetic overlayer above the free layer in the track direction for biasing the magnetic orientation of the free layer in the first magnetic orientation. Still further, the sensor has a lower nonmagnetic spacer layer between the magnetic underlayer and the free layer, and an upper nonmagnetic spacer layer between the magnetic overlayer and the free layer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a system comprises a sensor having a free layer that exhibits an anomalous Hall effect. Further, the sensor has a magnetic underlayer below the free layer in a track direction for biasing a magnetic orientation of the free layer in a first magnetic orientation, and a magnetic overlayer above the free layer in the track direction for biasing the magnetic orientation of the free layer in the first magnetic orientation. Still further, the sensor has a lower nonmagnetic spacer layer between the magnetic underlayer and the free layer, and an upper nonmagnetic spacer layer between the magnetic overlayer and the free layer.

In another general embodiment, a system comprises a sensor having a first free layer, and a second free layer above the first free layer in a track direction, where the free layers exhibit an anomalous Hall effect. The sensor also has a nonmagnetic spacer layer between the first free layer and the second free layer, a first set of electrodes configured to pass a Hall current through the first free layer and the second free layer in a first direction, and at least one second electrode configured to allow measurement of a Hall voltage of the first free layer and the second free layer in a second direction orthogonal to the first direction. Further, the sensor is configured such that the Hall voltage is substantially 0 volts when the sensor is at a quiescent state.

Figure 1:
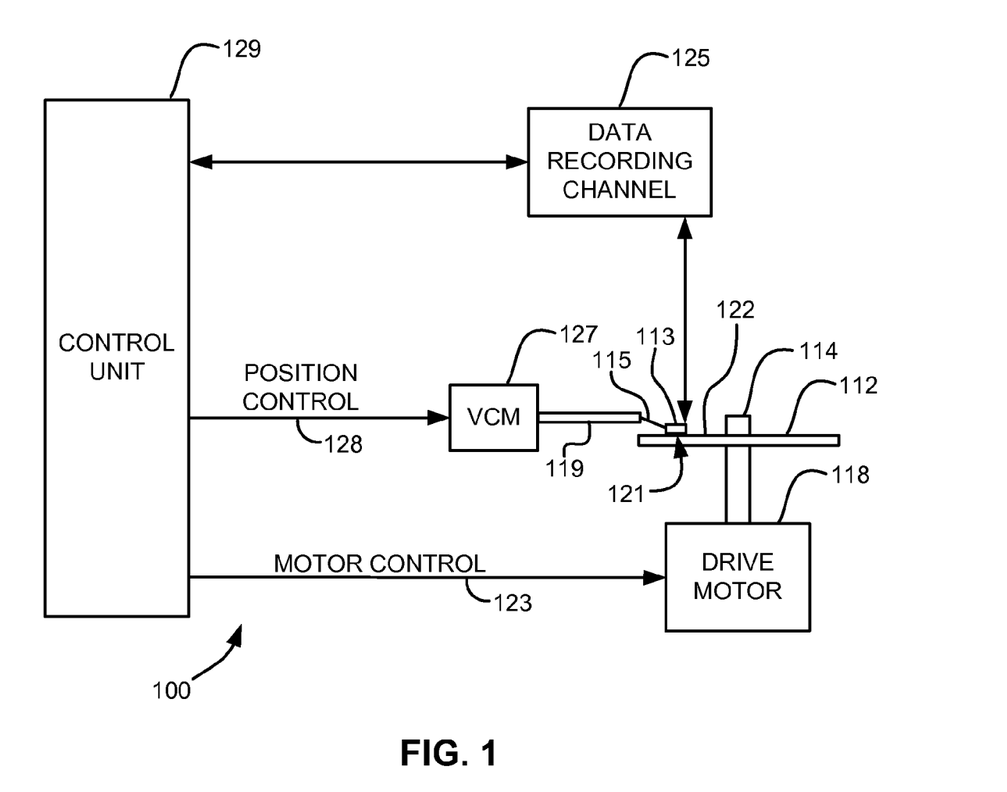
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap may be formed between the first and second pole piece layers of the write portion by a gap layer at or near a media facing side of the head (sometimes referred to as an ABS in a disk drive). The pole piece layers may be connected at a back gap. Currents are conducted through the coil layer, which produce magnetic fields in the pole pieces. The magnetic fields fringe across the gap at the media facing side for the purpose of writing bits of magnetic field information in tracks on moving media, such as in circular tracks on a rotating magnetic disk.

The second pole piece layer has a pole tip portion which extends from the media facing side to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2:
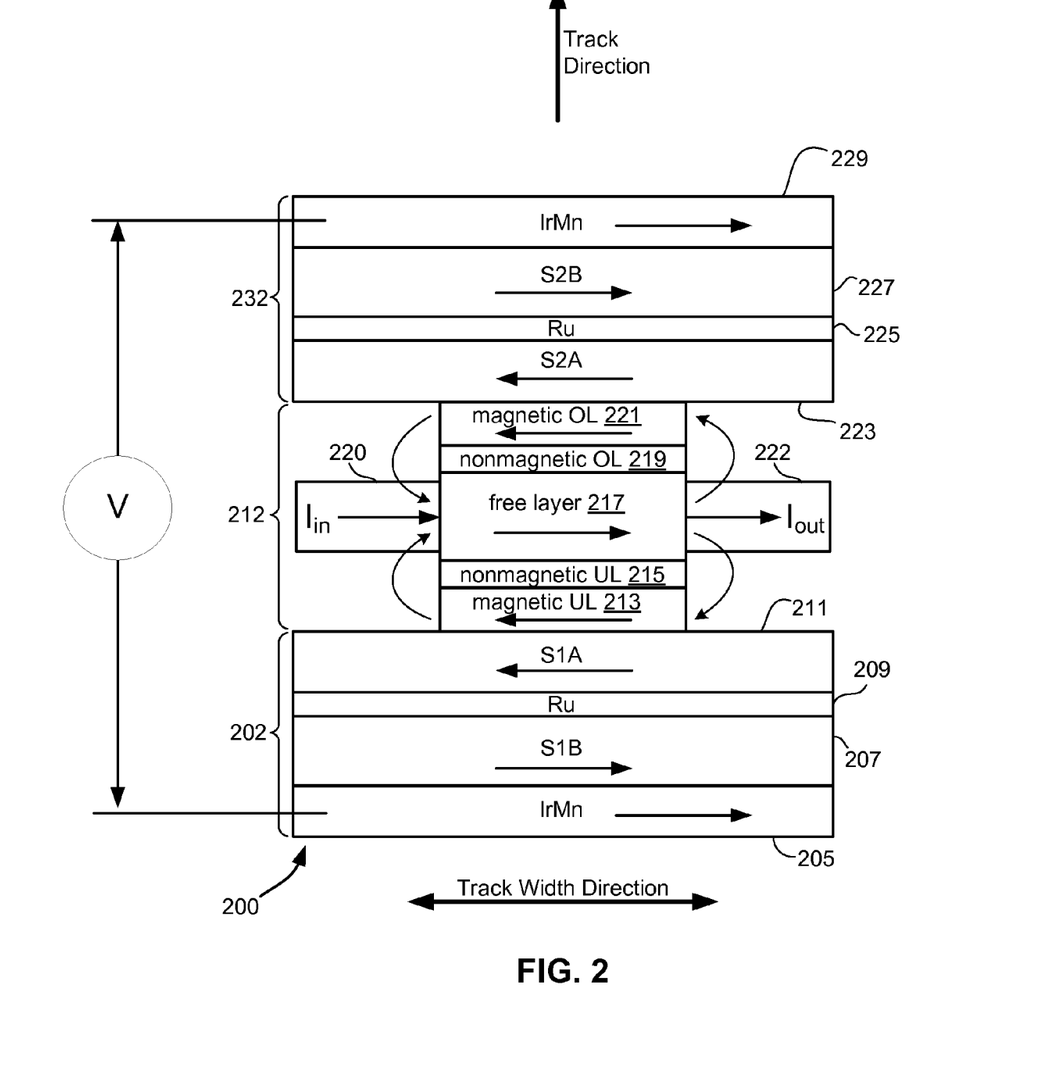
FIG. 2 is a media facing side view of an anomalous Hall effect magnetic read sensor, in accordance with one embodiment.

FIG. 2 depicts a media facing side view of a sensor stack 212 of an anomalous Hall effect magnetic sensor 200, in accordance with one embodiment. As an option, the sensor 200 may be implemented in conjunction with features from any other embodiment listed herein, such as those described with reference to the other FIGS. Of course, however, the sensor 200 and others presented herein may be used in various applications and/or in permutations which may or may not be specifically described in the illustrative embodiments listed herein. Further, the sensor 200 presented herein may be used in any desired environment.

As illustrated in FIG. 2, the sensor 200 is shown to comprise a first shield 202, a second shield 232, and a sensor stack 212. The sensor stack 212 is shown located between the first shield 202 and the second shield 232 in a track direction. The sensor 200 may comprise at least a portion of a read head employed for reading magnetic signal fields from a magnetic medium such as a rotating disk.

In one embodiment, a track direction refers to a direction of travel of one or more data tracks on a magnetic medium, such as the magnetic disk 112 described previously in the context of FIG. 1, as the magnetic medium is rotated by a drive mechanism.

Additionally, a track width direction refers to a direction by which the width of a data track on a magnetic medium may be measured. Accordingly, the track width direction may be substantially orthogonal (perpendicular) to the track direction. The track width direction may be substantially parallel to medium-facing surfaces of the layers 205-229 shown in FIG. 2.

The sensor stack 212 is shown to include a magnetic free layer 217, a nonmagnetic overlayer (OL) 219, a magnetic overlayer 221, a nonmagnetic underlayer (UL) 215, and a magnetic underlayer 213. With respect to FIG. 2 specifically, the magnetic underlayer 213 is shown above the first shield 202 in the track direction, the nonmagnetic underlayer 215 is shown above the magnetic underlayer 213 in the track direction, and the free layer 217 is shown above the nonmagnetic underlayer 215 in the track direction. Further, the nonmagnetic overlayer 219 is shown above the free layer 217 in the track direction, and the magnetic overlayer 221 is shown above the nonmagnetic overlayer 219 in the track direction. The nonmagnetic underlayer 215 and the nonmagnetic overlayer 219 may also be referred to as nonmagnetic spacer layers. The magnetic underlayer 213 may be in direct physical contact with, and ferromagnetically exchange coupled to, a shield 1A (S1A) layer 211. The magnetic overlayer 221 may be in direct physical contact with, and ferromagnetically exchange coupled to, a shield 2A (S2A) layer 223.

In one embodiment, at least one of the magnetic overlayer 221, the magnetic underlayer 213, and the free layer 217 have about a same width in the track width direction. Further, the nonmagnetic underlayer 215 and the nonmagnetic overlayer 219 may have about the same width in the track width direction as each of the magnetic overlayer 221, the magnetic underlayer 213, and the free layer 217.

In some embodiments, a current I is passed through the sensor stack 212 in the track width direction via electrodes 220, 222. The current I may be referred to as a bias current. In the present description, a bias current may also be referred to as a Hall current. Due to the anomalous Hall effect, the passage of the bias current through the free layer 217 in the stated direction can create a voltage that is measurable in the direction orthogonal to the bias current direction. The voltage, also referred to as a Hall voltage, may be measured by a pair of electrodes electrically attached at the shields. For example, a first electrode may be attached to the first shield 202, and a second electrode may be attached to the second shield 232. In this manner, the shields may also function as leads. In another approach, if one of the shields 202 and 232 is connected to a ground, and the other of the shields 202 and 232 is connected to a voltage detector, a Hall voltage across the sensor stack 212 may also be measured. The measured Hall voltage will vary linearly with the component of magnetization of the free layer 217 in the direction orthogonal to both the track-direction (or Hall voltage detection direction) and the track-width direction (or bias current direction), corresponding to direction in or out of the page of FIG. 2 In this way, the measured Hall voltage may be used to decode data based on the influence of a magnetic medium on the magnetic orientation of the free layer 217.

In another embodiment, a bias current instead passes through the sensor stack 212 in a direction generally parallel to the track direction. For example, a bias current may be passed through the sensor stack 212 by passing the current via a first electrode (not shown) coupled to the first shield 202 to a second electrode (not shown) coupled to the second shield 232, or by passing the current via the second electrode coupled to the second shield 232 to the first electrode coupled to the first shield 202. In such an embodiment, a voltage or potential difference may be measured across the sensor stack 212 in the track width direction. Specifically, a Hall voltage may be measured across the free layer 217 in the track width direction. For example, a first electrode for measuring the Hall voltage may be coupled to an available surface of the free layer 217 that does not face a magnetic medium, and a second electrode may be coupled to another available surface of the free layer 217 that also does not face the magnetic medium, where the two available surfaces are on opposite sides of the free layer 217 in the track width direction.

In one embodiment, electrodes attached on opposite sides of the free layer 217 in the track width direction may be of substantially equal stripe height as the free layer 217, where the stripe height is in a direction into the page of FIG. 2. In another embodiment, the electrodes attached on opposite sides of the free layer 217 in the track width direction may have a stripe height more than a stripe height of the free layer 217.

In one embodiment, the free layer 217 may be biased by one or more other layers. The layers that bias the free layer 217 may include other layers of the sensor stack 212, which may be referred to as in-stack layers. Biasing of the free layer 217 by in-stack layers magnetically stabilizes the free layer 217, rendering the free layer 217 better configured for reading magnetic signal fields from the magnetic medium.

For example, the free layer 217 has a magnetization, or magnetic orientation, that is nominally biased along the track-width direction, and in a direction antiparallel to the magnetization directions of both the magnetic underlayer 213 and the magnetic overlayer 221. The magnetization of the free layer 217 may rotate freely along, or in, a film plane of the free layer 217. The free layer 217 may comprise one or more layers of magnetic material that exhibits the anomalous Hall effect when passing current.

As a result of stabilizing the free layer 217 with the magnetically antiparallel magnetic overlayer 221 and magnetic underlayer 213, the voltage or potential difference measured across the sensor stack 212 may be substantially 0 volts when the sensor stack 212 is in its bias state shown in FIG. 2. In other words, the voltage or potential difference measured across the sensor stack 212 may be substantially 0 volts when the sensor stack 212 is in a quiescent state. As a benefit of such a configuration, the voltage or potential difference measured across the sensor stack 212 while in use may vary between a negative voltage and a positive voltage, where the negative voltage and the positive voltage may be of substantially equal magnitude. Accordingly, the sensor 200 may enable the reading of a magnetic medium by way of determining the polarity of a Hall voltage across the free layer 217 in a direction orthogonal to a direction of a bias current.

As shown in FIG. 2, a magnetic orientation of the magnetic underlayer 213 is biased such that it is parallel with a magnetic orientation of the magnetic overlayer 221. Specifically, one or more layers of the first shield 202 may bias the magnetic orientation of the magnetic under layer 213, and, similarly, one or more layers of the second shield 232 may bias the magnetic orientation of the magnetic overlayer 221. More specifically, a shield 1A (S1A) layer 211 may bias the magnetic underlayer 213 with a particular magnetization direction, and a shield 2A (S2A) layer 223 may bias the magnetic overlayer 221 with the same particular magnetization direction. In one embodiment, the magnetic overlayer 221 may be exchange coupled to the S2A layer 223, and the magnetic underlayer 213 may be exchange coupled to the S1A layer 211. In such an embodiment, magnetic orientation for each of the magnetic underlayer 213 and the magnetic overlayer 221 may be pinned in the same orientation for stabilizing the free layer 217. Each of the magnetic overlayer 221 and the magnetic underlayer 213 may or may not be anomalous Hall effect layers.

In one embodiment, a measured Hall voltage may be proportional to the magnetization that is oriented in the applied field direction, e.g., from a magnetic disk. Further, the Hall voltage may be at a maximum when magnetization of the free layer 217 is fully aligned parallel to an external field from the magnetic medium, and thus in a first orientation orthogonal to the magnetic orientation of the magnetic underlayer 213 and the magnetic overlayer 221, such as into the page of FIG. 2. Similarly, the Hall voltage may be at a minimum when magnetization of the free layer 217 is fully aligned in a second orientation that is antiparallel to the first orientation, such as out of the page of FIG. 2.

As already noted, a first set of electrodes may pass a current through the sensor stack 212 in a first direction, and a second set of electrodes may measure the voltage or potential difference across the sensor stack 212 in a second direction orthogonal to the first direction. In some embodiments, the first set of electrodes and the second set of electrodes may include a shared electrode. For example, a first electrode and a second electrode may be used to pass the current through the sensor stack 212, and the second electrode and a third electrode may be used to measure the voltage or potential difference across the sensor stack 212. Such embodiments may be referred to as three terminal devices. Three terminal devices may be implemented by way of sharing a ground between two pairs of electrodes, such as in an embodiment where electrode 222 and layer 205 of FIG. 2 are both coupled to ground.

In other embodiments, the first set of electrodes may not share any electrodes with the second set of electrodes. Such embodiments may be referred to as four terminal devices due to the presence of four discrete electrodes. In such embodiments, a first electrode may located on the first shield 202, a second electrode may be located on the second shield 232, a third electrode, e.g., 220, may be located on a first surface of the free layer 217, and a fourth electrode, e.g., 222, may be located on a second surface of the free layer 217 that is generally positioned on an opposite side of the sensor stack 212 as the first surface.

In some embodiments, the sensor stack 212 may be adequately stable without all of the layers shown within the shields 202 and 232 of FIG. 2. For example, at least the Ru layers 209 and 225 and the S1B and S2B layers 207 and 227 may not be present.

Further, by providing magnetic stabilization of the free layer 217 via in-stack layers, the need for side stabilization via hard or soft magnetic bias may be eliminated. Eliminating the need for side stabilization via hard or soft magnetic bias allows for the placement electrodes 220, 222 adjacent to the sensor 200.

The biasing of the free layer 217 by the magnetic underlayer 213 and the magnetic overlayer 221 may be aided by one or more nonmagnetic layers, such as nonmagnetic overlayer 219 and/or nonmagnetic underlayer 215. Specifically, the nonmagnetic overlayer 219 may be sandwiched between, and serve to prevent direct magnetic coupling between the magnetic overlayer 221 and the free layer 217, thereby allowing fringe magnetic fields from the magnetic overlayer 221 to stabilize the free layer 217. Similarly, the nonmagnetic underlayer 215 may be sandwiched between, and serve to prevent direct magnetic coupling between the magnetic underlayer 213 and the free layer 217. Materials may be selected for one or both of the nonmagnetic underlayer 215 and the nonmagnetic overlayer 219 in order to prevent ferromagnetic coupling of the free layer 217 with the magnetic underlayer 213 and the magnetic overlayer 221, respectively.

In some embodiments, nonmagnetic overlayer 219 may serve as an antiparallel coupling layer for creating a weak antiparallel coupling between the free layer 217 and the magnetic overlayer 221, thereby providing further biasing. Similarly, the nonmagnetic underlayer 215 may serve as an antiparallel coupling layer between the magnetic underlayer 213 and the free layer 217. Thus, one or both of the nonmagnetic underlayer 215 and the nonmagnetic overlayer 219 may comprise ruthenium (Ru). Such a Ru layer may be approximately 20 angstroms thick in the track direction.

In other embodiments, one or both of the nonmagnetic underlayer 215 and the nonmagnetic overlayer 219 may each comprise a nonmagnetic material with a higher resistivity than Ru.

Substantially equal magnetic fields from the magnetic overlayer 221 and the magnetic underlayer 213 on both sides of the free layer 217 in the track direction may serve to stabilize the free layer 217 in a magnetic orientation that is antiparallel to the magnetic overlayer 221 and the magnetic underlayer 213. To facilitate this stabilization, the magnetic overlayer 221 and the magnetic underlayer 213 may have parallel magnetization orientations, and be approximately equally spaced from the free layer 217 in the track direction.

Stabilization strength of the in-stack layers may be tuned by one or more of: varying thickness in the track direction of the magnetic overlayer 221 and/or the magnetic underlayer 213, varying thickness in the track direction of the nonmagnetic overlayer 219 and the nonmagnetic underlayer 215, varying a magnetization of the magnetic overlayer 221 and the magnetic underlayer 213, etc.

In various embodiments, the magnetic underlayer 213 and the magnetic overlayer 221 may comprise one or more materials with a sufficiently high magnetization. Such materials may include NiFe and/or CoFe. The magnetization of a given material may be inversely correlated to a thickness for a layer of that material. For example, as the magnetization increases for the materials comprising the magnetic underlayer 213 and the magnetic overlayer 221, a thickness of the magnetic underlayer 213 and the magnetic overlayer 221 may decrease while imparting a substantially equal magnetic field on the free layer 217.

Additionally, the free layer 217 may comprise one or more materials that exhibit the anomalous Hall effect. In various embodiments, materials exhibiting a greater anomalous Hall effect are preferred for the free layer 217 over materials that exhibit less of the anomalous Hall effect. Materials chosen for use as the free layer 217 may exhibit large Hall resistivity. In one embodiment, the free layer 217 may comprise an iron-platinum (FePt) alloy or a Heusler alloy. In other embodiments, the free layer 217 may include any combination of one or more of cobalt (Co), aluminum (Al), nickel (Ni), iron (Fe), chromium (Cr), platinum (Pt), bismuth (Bi), boron (B), dysprosium (Dy), gadolinium (Gd), manganese (Mn), terbium (Tb), and one or more rare earth elements. For example, the free layer 217 may comprise one or more layers of materials such as CoFe or NiFe. In one embodiment, the free layer 217 may include each of cobalt, manganese, and aluminum.

Referring still to FIG. 2, the first shield 202 is shown to comprise a shield 1B (S1B) layer 207 above an antiferromagnetic layer 205, e.g., of IrMn, in the track direction, as well as a Ru layer 209 above the S1B layer 207 in the track direction, and a shield 1A (S1A) layer 211 above the Ru layer 209 in the track direction. Similarly, the second shield 232 is shown to comprise a shield 2A (S2A) layer 223 above the magnetic overlayer 221 of the sensor stack 212 in the track direction, a Ru layer 225 above the S2A layer 223 in the track direction, a shield 2B (S2B) layer 227 above the Ru layer 225 in the track direction, and an antiferromagnetic layer 229, e.g., of IrMn, PtMn, or other antiferromagnetic material, above the S2B layer 227 in the track direction. In one embodiment, the Ru layer 209 may serve as an antiparallel coupling layer between the S1B layer 207 and the S1A layer 211. Similarly, the Ru layer 225 may serve as an antiparallel coupling layer between the S2B layer 227 and the S2A layer 223.

In another embodiment additional Ru layers (not shown) may be formed between the magnetic underlayer 213 and the S1A layer 211, and between the magnetic overlayer 221 and the S2A layer 223. In such embodiment, for example, the magnetic orientations of the magnetic underlayer 213 and the S1A layer 211 may be antiparallel, and thus the pinning orientation imposed by the antiferromagnetic layer 205 would be opposite the direction shown in FIG. 2.

To stabilize the sensor stack 212, the size and configuration of the layers of the first shield 202 and the second shield 232 may be substantially identical and mirrored across the sensor stack 212. For example, in one embodiment, the antiferromagnetic layers 205 and 229 may be substantially identical, the S1B layer 207 and the S2B layer 227 may be substantially identical, the Ru layers 209 and 225 may be substantially identical, and the S1A layer 211 and the S2A layer 223 may be substantially identical. In such an embodiment, the first shield 202 may bias or pin the magnetic underlayer 213 with pinning strength nearly identical to the biasing or pinning of the magnetic overlayer 221 by the second shield 232.

In one embodiment, a distance or spacing between the magnetic underlayer 213 and the magnetic overlayer 221 in the track direction defines a gap thickness or gap spacing, which may determine a resolution of the sensor 200. In some embodiments, one or more layers of each of the shields may comprise a material such as NiFe.

In various embodiments, the free layer 217 may be less than 120 angstroms thick in the track direction. Further, a gap between the magnetic underlayer 213 and the magnetic overlayer 221 may be less than 200 angstroms in the track direction.

Figure 3:
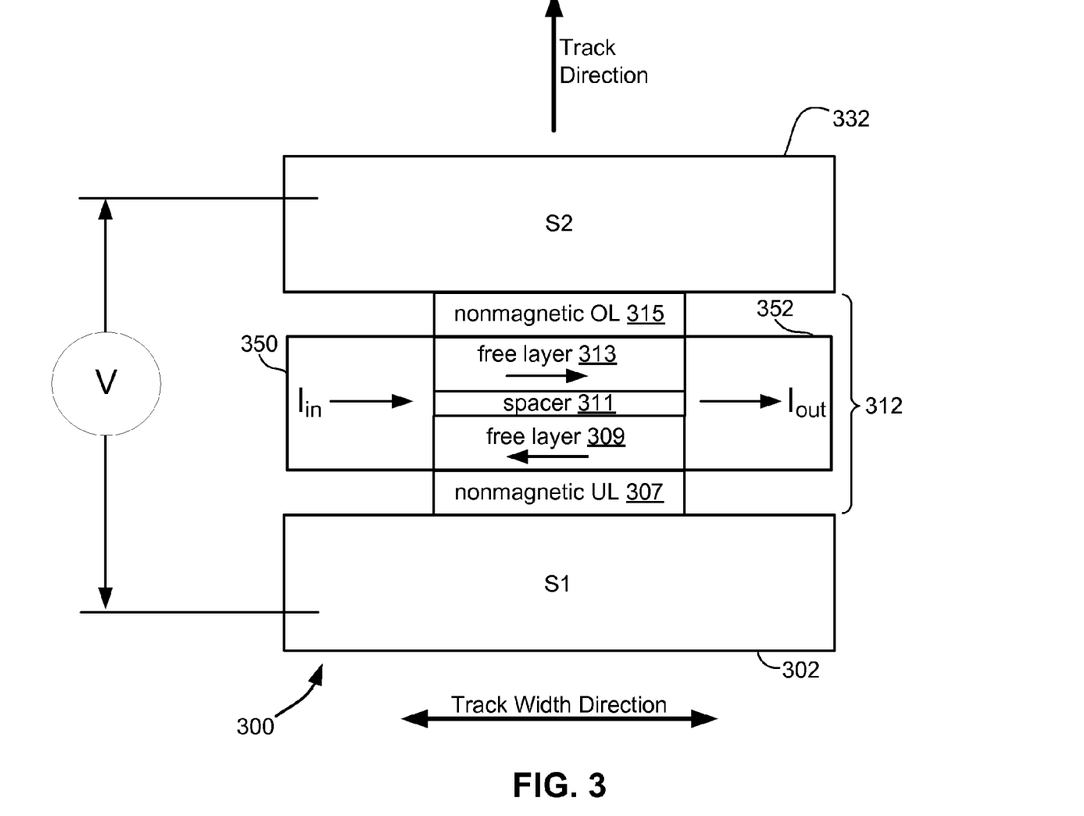
FIG. 3 is a media facing side view of an anomalous Hall effect magnetic scissor read sensor, in accordance with another embodiment.

FIG. 3 depicts a media facing side view of a sensor stack 312 of an anomalous Hall effect magnetic scissor read sensor 300, in accordance with one embodiment. As an option, the sensor 300 may be implemented in conjunction with features from any other embodiment listed herein, such as those described with reference to the other FIGS. Of course, however, the sensor 300 and others presented herein may be used in various applications and/or in permutations which may or may not be specifically described in the illustrative embodiments listed herein. Further, the sensor 300 presented herein may be used in any desired environment.

As illustrated in FIG. 3, the sensor 300 is shown to comprise a first shield 302, a second shield 332, and a sensor stack 312. The sensor stack 312 is shown located between the first shield 302 and the second shield 332 in a track direction. The sensor 300 may comprise at least a portion of a read head employed for reading magnetic signal fields from a rotating disk, such as a magnetic medium.

The sensor stack 312 is shown to include a nonmagnetic underlayer 307 above the first shield 302 in a track direction, a magnetic first free layer 309 above the nonmagnetic underlayer 307 in the track direction, a spacer layer 311 above the first free layer 309 in the track direction, a magnetic second free layer 313 above the spacer layer 311 in the track direction, and a nonmagnetic overlayer 315 above the second free layer 313 in the track direction. When the sensor stack 312 is in a quiescent state, the first free layer 309 may be oriented magnetically antiparallel to the second free layer 313. Still further, a current I, which may also be referred to as a bias current, is shown passing through the sensor stack 312 in a track width direction via electrodes 350, 352. Passage of the bias current through the free layers 309 and 313 in a given direction creates a Hall effect within the free layers 309 and 313, and the Hall effect may change a voltage that is measurable in a direction orthogonal to the bias current direction.

In various embodiments, the current I of FIG. 3 may be similar to the current I of FIG. 2. The nonmagnetic overlayer 315 may be similar to the nonmagnetic overlayer 219, and the nonmagnetic underlayer 307 may be similar to the nonmagnetic underlayer 215, which were described previously within the context of FIG. 2. Further, each of the free layer 309 and the free layer 313 may comprise an instance of the free layer 217, as described in the context of FIG. 2. Still further, each of the free layer 309 and the free layer 313 may be substantially identical to each other in composition. For example, the free layer 309 and the free layer 313 may have the same anomalous hall coefficient.

As shown in FIG. 3, the current I passes through the sensor stack 312 in the track width direction. The current I may be referred to as a bias current. Passage of the bias current through the free layers 309 and 313 in the bias current direction can produce an anomalous Hall voltage that is measurable in a direction orthogonal to the bias current direction. This anomalous Hall voltage may be measured by a pair of electrodes attached at the shields 302 and 332. For example, a first electrode may be attached to the first shield 302, and a second electrode may be attached to the second shield 332. In this manner, the shields may also function as leads. In another approach, if one of the shields 302 and 332 is connected to a ground, and the other of the shields 302 and 332 is connected with a voltage detector, a Hall voltage across the sensor stack 312 or the free layers 309 and 313 may be measured.

In other embodiments, a bias current passes through the sensor stack 312 in a direction generally parallel to the track direction. In either case, the bias current may be passed through the sensor stack 312 in a direction parallel to media-facing surfaces of the free layers 309 and 313. For example, a bias current may pass through the sensor stack 312 by passing the current via a first electrode (not shown) coupled to the first shield 302 to a second electrode (not shown) coupled to the second shield 332, or by passing the current via the second electrode coupled to the second shield 332 to the first electrode of the first shield 302. In such an embodiment, a voltage or potential difference may be measured across the sensor stack 312 in the track width direction. Specifically, a Hall voltage may be measured across the free layers 309 and 313 in the track width direction. For example, a first electrode may be coupled to first co-planar surfaces of the free layers 309 and 313 that do not face the magnetic medium, and a second electrode may be coupled second co-planar surfaces of the free layers 309 and 313 that also do not face the magnetic medium, where the first co-planar surfaces are on opposite sides of the free layers 309 and 313 from the second co-planar surfaces in the track width direction. The bias current may also be referred to as a Hall current.

In various approaches, an anomalous Hall effect magnetic scissor read sensor with two free layers may be implemented as a three terminal device or a four terminal device.

In various embodiments, the first free layer 309 and the second free layer 313 are both magnetic layers that exhibit a strong anomalous Hall effect. As a benefit of having multiple magnetic layers within the sensor stack 312, an output signal of sensor 300 may be double that of an output signal of a sensor having only one free layer. For example, such an output signal may correspond to a Hall voltage that is measured across the sensor stack in a direction perpendicular to that of a bias current.

In one embodiment, the first free layer 309 and the second free layer 313 may be passively antiparallel coupled. In another embodiment, there may be negligible ferromagnetic coupling between the first free layer 309 and the second free layer 313.

In one embodiment, the spacer layer 311 provides magnetic decoupling between the first free layer 309 and the second free layer 313. The spacer layer 311 may comprise a nonmagnetic material, such as a nonmagnetic metal, semiconductor, insulator, etc. Further, the spacer layer 311 may comprise a material without a long spin diffusion length, e.g., to avoid spin transfer between the free layers 309 and 313. In one embodiment, the spacer layer 311 may comprise an insulating material, such as MgO or other known tunnel barrier material. In other embodiments, the spacer layer 311 may include materials such as tungsten (W), tantalum (Ta), and/or other materials with a resistivity of about 100-200 $\mu\Omega$-cm. In another embodiment, the spacer layer 311 may comprise a material with a large spin hall angle, which may provide some signal amplification to a measured Hall voltage due to potential that builds at the spacer layer 311. In yet another embodiment, the spacer layer 311 may be a ruthenium layer. In various embodiments, the spacer layer 311 may have a thickness of 0.5-5 nanometers in the track direction.

Furthermore, in various embodiments a thickness of the layers 309-313 in the track direction may be less than 120 angstroms, and, more preferably, may be less than 100 angstroms. Additionally, one or more of the layers 307-315 may have a substantially same length in the track width direction.

Figure 4:
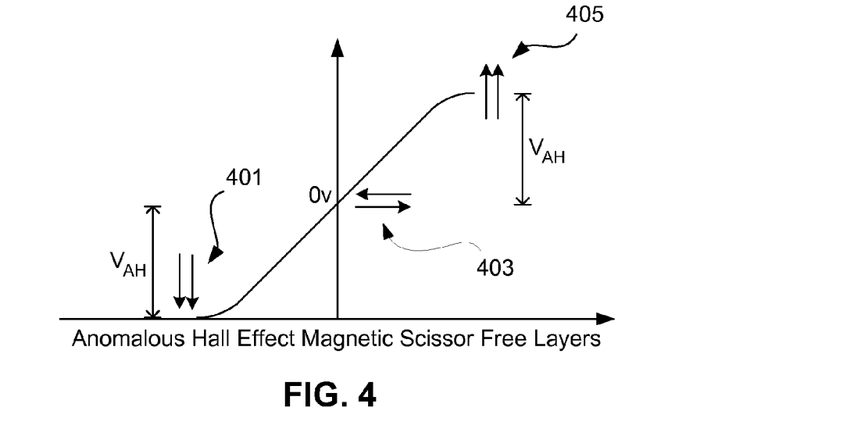
FIG. 4 is an illustration of signal output of an anomalous Hall effect magnetic scissor read sensor, in accordance with an embodiment.

FIG. 4 illustrates an output signal, or measured Hall voltage, of an anomalous Hall effect magnetic scissor read sensor, such as sensor 300, in accordance with one embodiment.

When a bias current is passed in a first direction through the free layers 309 and 313 of the sensor stack 312, a nominal magnetic orientation of the free layers 309 and 313 may be collinear with the track width direction. In various embodiments, the first direction may be either generally parallel to the track width direction, or parallel to the track direction, depending on the direction of application of the bias current. Further, as an external magnetic field is applied, which thus rotates the magnetic orientation of the free layers 309 and 313 into or out of the page of FIG. 3, a voltage or potential difference may develop across the direction orthogonal to first direction, but in the plane of FIG. 3. Thus, as a result of passing the bias current in the first direction through the free layers 309 and 313, a Hall voltage may be measured across the sensor stack 312 in a second direction that is perpendicular to the first direction.

As shown in FIG. 4, as a result of stabilization between the magnetically antiparallel first free layer 309 and the second free layer 313, a voltage or potential difference measured across the sensor stack 312 may be about 0 volts when the sensor stack 312 is in a nominal bias state 403, i.e., the first and second free layers 309 and 313 are magnetized antiparallel to each other and collinear with the track width direction. Further, as indicated in FIG. 4, the voltage or potential difference measured across the sensor stack 312 linearly varies between a maximum negative voltage 401 and maximum positive voltage 405 as the magnetizations of both free the layers 309 and 313 become parallel to each other, rotated 90 degrees from the quiescent state. More generally, the Hall voltage may vary linearly with the sine of this rotation angle, and the sine of the rotation angle of the free layers 309 and 313 may also vary approximately linearly with the perpendicular (to the media facing surface of the Hall sensor of FIG. 3) component of a magnetic field from a recording media. In this way, the anomalous Hall effect sensor of FIG. 3 (and similarly for the embodiment of FIG. 2) can act as a linear transducer in equivalent fashion to that of conventional read sensors.

Figure 5:
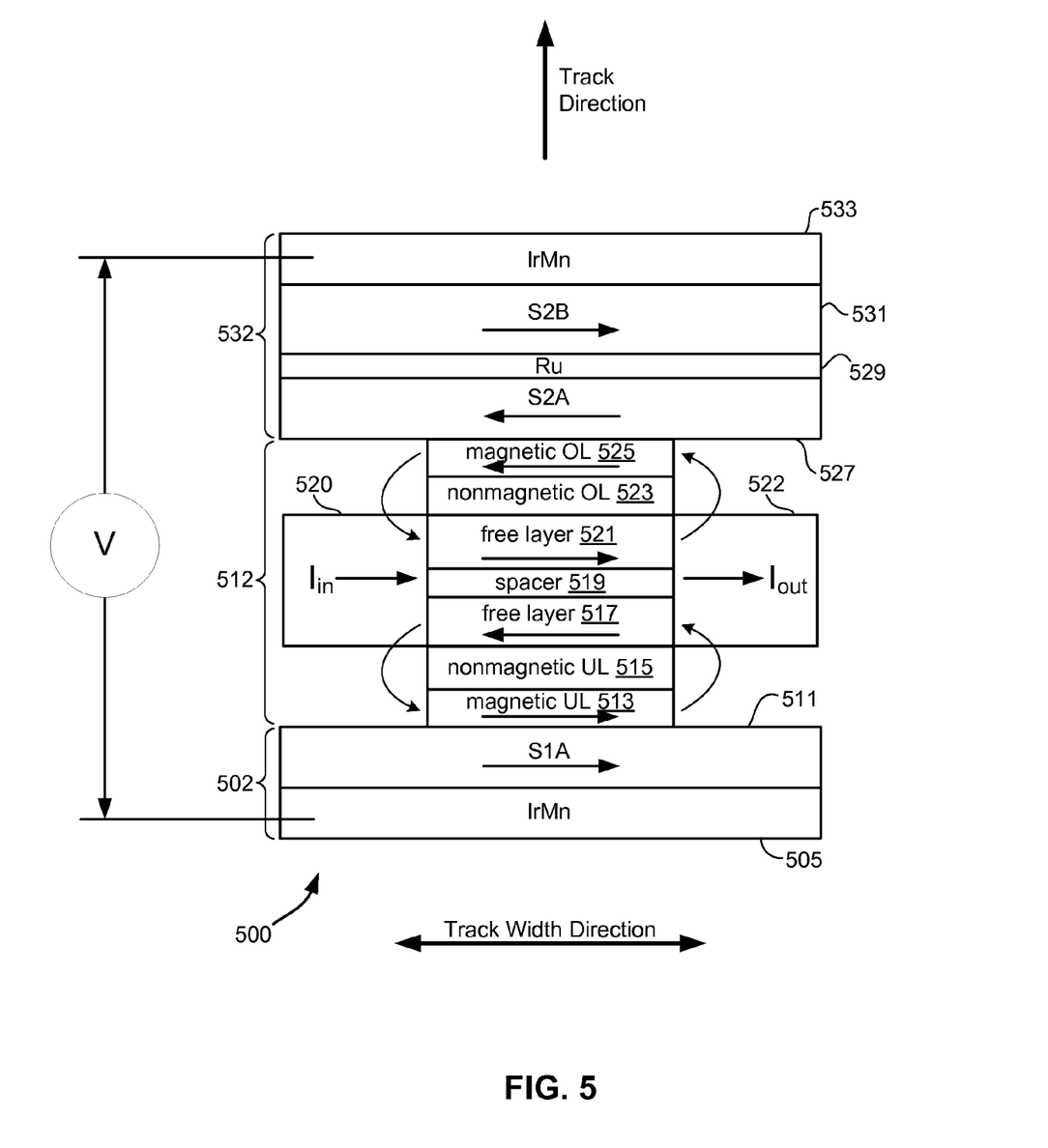
FIG. 5 is a media facing side view of an anomalous Hall effect scissor magnetic read sensor, in accordance with yet another embodiment.

FIG. 5 depicts a media facing side view of a sensor stack 512 of an anomalous Hall effect magnetic scissor read sensor 500, in accordance with one embodiment. As an option, the sensor 500 may be implemented in conjunction with features from any other embodiment listed herein, such as those described with reference to the other FIGS. Of course, however, the sensor 500 and others presented herein may be used in various applications and/or in permutations which may or may not be specifically described in the illustrative embodiments listed herein. Further, the sensor 500 presented herein may be used in any desired environment.

As illustrated in FIG. 5, the sensor 500 is shown to comprise a first shield 502, a second shield 532, and a sensor stack 512. The sensor stack 512 is shown located between the first shield 502 and the second shield 532 in a track direction. The sensor 500 may comprise at least a portion of a read head employed for reading magnetic signal fields from a rotating disk, such as a magnetic medium.

The sensor stack 512 is shown to include a magnetic underlayer 513 above the first shield 502 in the track direction, a nonmagnetic underlayer 515 above the magnetic underlayer 513 in the track direction, a first free layer 517 above the nonmagnetic underlayer 515 in the track direction, a spacer layer 519 above the first free layer 517 in the track direction, a second free layer 521 above the spacer layer 519 in the track direction, a nonmagnetic overlayer 523 above the second free layer 521 in the track direction, and a magnetic overlayer 525 above the nonmagnetic overlayer 523 in the track direction. When the sensor stack 512 is in a quiescent state, the first free layer 517 may be oriented magnetically antiparallel to the second free layer 521.

Further, a current I is shown passing through the sensor stack 512 in a track width direction via electrodes 550, 522. More specifically, the current I is shown passing through the first free layer 517 and the second free layer 521. Passage of the bias current through the free layers 517 and 521 in a given direction creates a Hall effect within the free layers 517 and 521, and the Hall effect may change a voltage that is measurable in a direction orthogonal to the given direction.

As shown in FIG. 5, the first shield 502 is shown to comprise a shield 1A (S1A) layer 511 above an antiferromagnetic layer 505 in the track direction. In one embodiment, the S1A layer 511 may be exchange pinned the antiferromagnetic layer 505. Also, the second shield 532 is shown to comprise a shield 2A (S2A) layer 527 above the magnetic overlayer 525 of the sensor stack 512 in the track direction, a Ru layer 529 above the S2A layer 527 in the track direction, a shield 2B (S2B) layer 531 above the Ru layer 529 in the track direction, and an antiferromagnetic layer 533 above the S2B layer 531 in the track direction.

In various embodiments, the layers 527-533 comprising the second shield 532 may be similar to the layers 223-229 comprising the second shield 232, described in the context of FIG. 2. Further, the magnetic underlayer 513 may be similar the magnetic underlayer 213 described in the context of FIG. 2, and the magnetic overlayer 525 may be similar to the magnetic overlayer 221 described in the context of FIG. 2. Still further, the nonmagnetic underlayer 515 may be similar the nonmagnetic underlayer 215, and the nonmagnetic overlayer 523 may be similar to the nonmagnetic overlayer 219, each of which are described in the context of FIG. 2.

However, unlike the shields of FIG. 2, the shields 502 and 532 of FIG. 5 are configured such that a magnetic orientation of the S1A layer 511 is antiparallel to a magnetic orientation of the S2A layer 527.

As a result of the S1A layer 511 being magnetically antiparallel to the S2A layer 527, a magnetic orientation of the magnetic underlayer 513 is biased or pinned antiparallel to a magnetic orientation of the magnetic overlayer 525. In one embodiment, the magnetic overlayer 525 may be exchange coupled to the S2A layer 527, and the magnetic underlayer 513 may be exchange coupled to the S1A layer 511. In such an embodiment, the magnetization for the magnetic underlayer 513 may be biased or pinned antiparallel to the magnetization of the magnetic overlayer 525 for stabilizing the free layers 517 and 521. Specifically, the magnetic underlayer 513 may magnetically stabilize the first free layer 517 in a first magnetic orientation, and the magnetic overlayer 525 may magnetically stabilize the second free layer 521 in a second magnetic orientation antiparallel to the first magnetic orientation, as illustrated by the magnetic fields shown in FIG. 5. In such an embodiment, the first shield 502 may bias or pin the magnetic underlayer 513 with pinning strength nearly identical to the biasing or pinning strength of the magnetic overlayer 525 by the second shield 532.

In various embodiments, the bias current of FIG. 5 may be similar to the bias current described in the context of FIG. 2. Further, the free layers 517 and 521 may be similar to the free layers 309 and 313, respectively, as described in the context of FIG. 3. Still further, each of the free layer 517 and the free layer 521 may be substantially identical to each other in composition.

In some embodiments, the current I passes through the sensor stack 512 in the track width direction. The current I may be referred to as a bias current. In the present description, a bias current may also be referred to as a Hall current. Passage of the bias current through the free layers 517 and 521 in a given direction creates a Hall effect within the magnetic free layers 517 and 521, and the Hall effect may change a voltage that is measurable in a direction orthogonal to the given direction. The voltage, also referred to as a Hall voltage, may be measured by a pair of electrodes attached at the shields. For example, a first electrode may be attached to the first shield 502, and a second electrode may be attached to the second shield 532. In this manner, the shields may also function as leads. In another approach, if one of the shields 502 and 532 is connected to a ground, and the other of the shields 502 and 532 is connected to a voltage detector, a Hall voltage across the sensor stack 512 may be measured. The measured Hall voltage may vary as the magnetic orientations of the free layers 517 and 521 change. In this way, the measured Hall voltage may be used to decode data based on the influence of a magnetic medium on the magnetic orientations of the free layers 517 and 521.

In another embodiment, a bias current instead passes through the sensor stack 512 in a direction generally parallel to the track direction. For example, a bias current may be passed through the sensor stack 512 by passing the current via a first electrode (not shown) coupled to the first shield 502 to a second electrode (not shown) coupled to the second shield 532, or by passing the current via the second electrode coupled to the second shield 532 to the first electrode coupled to the first shield 502. In such an embodiment, a voltage or potential difference may be measured across the sensor stack 512 in the track width direction.

Specifically, a Hall voltage may be measured across the free layers 517 and 521 in the track width direction. For example, a first electrode may be coupled to first co-planar surfaces of the free layers 517 and 521 that do not face the magnetic medium, and a second electrode may be coupled second co-planar surfaces of the free layers 517 and 521 that also do not face the magnetic medium, where the first co-planar surfaces are across the free layers 517 and 521 from the second co-planar surfaces in the track width direction.

In one embodiment, electrodes attached across the free layers 517 and 521 in the track width direction may be of substantially equal stripe height as the free layers 517 and 521 and the spacer layer 519. In another embodiment, the electrodes attached across the free layers 517 and 521 in the track width direction may have a stripe height less than a stripe height of the free layers 517 and 521 and the spacer layer 519.

As a benefit of the embodiment illustrated in FIG. 5, in-stack magnetic underlayer 513 and magnetic overlayer 525 may provide additional longitudinal stabilization to the free layers 517 and 521 via stray fields. As a result, inter-switching of the magnetization directions of the free layers 517 and 521 may be avoided, which may reduce possible non-linear low frequency noise.

Moreover, any of the structures and/or steps may be fabricated and/or implemented using known materials and/or techniques, as would become apparent to one skilled in the art upon reading the present specification.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
 a sensor having:
  a first free layer;
  a second free layer above the first free layer in a track direction, the free layers exhibiting an anomalous Hall effect;
  a nonmagnetic spacer layer between the first free layer and the second free layer;
  a magnetic underlayer below the first free layer in the track direction for biasing a magnetic orientation of the first free layer in a first magnetic orientation;
  a magnetic overlayer above the second free layer in the track direction for biasing a magnetic orientation of the second free layer in a second magnetic orientation antiparallel to the first magnetic orientation;
  a lower nonmagnetic spacer layer between the magnetic underlayer and the first free layer; and
  an upper nonmagnetic spacer layer between the magnetic overlayer and the second free layer;
 a first set of electrodes configured to pass a current through the first free layer and the second free layer in a first direction; and
 at least one second electrode configured to allow measurement of a Hall voltage of the first free layer and the second free layer in a second direction orthogonal to the first direction;
 wherein a magnetic orientation of the magnetic overlayer is oriented antiparallel to the magnetic orientation of the second free layer, and a magnetic orientation of the magnetic underlayer is oriented antiparallel to the magnetic orientation of the first free layer;
 wherein the sensor is configured such that the Hall voltage is substantially 0 volts when the sensor is at a quiescent state.

2. The system as recited in claim 1, comprising:
 a first shield; and
 a second shield.

3. The system as recited in claim 1, wherein the first direction is parallel to a media-facing surface of the first free layer, such that the first set of electrodes are configured to pass the current through edges of the free layers in a direction parallel to the media-facing surface.

4. The system as recited in claim 3, wherein the first direction is in a track width direction.

5. The system as recited in claim 3, wherein the first direction is in a track direction.

6. A magnetic data storage system, comprising:
 at least one of the sensor as recited in claim 1;
 a magnetic medium;
 a drive mechanism for passing the magnetic medium over the at least one sensor; and a controller electrically coupled to the at least one sensor for controlling operation of the at least one sensor.

7. The system as recited in claim 1, wherein a magnetic orientation of the first free layer is nominally antiparallel with a magnetic orientation of the second free layer.

8. The system as recited in claim 1, wherein the sensor outputs a positive Hall voltage upon influence of an external magnetic field oriented in a third direction orthogonal to a media-facing surface of the sensor, and a negative Hall voltage upon influence of an external magnetic field oriented in a fourth direction antiparallel to the third direction.

9. The system as recited in claim 1, wherein the first free layer comprises a substantially identical composition as the second free layer, and each of the first free layer and the second free layer include manganese and at least one of iron, cobalt, nickel, platinum, boron, bismuth, and a rare earth element.

* * * * *